Patented Jan. 5, 1943

2,307,453

UNITED STATES PATENT OFFICE 2,307,453

CLARIFICATION OF MURKY SOLUTIONS, PARTICULARLY THOSE RESULTING FROM ALKALINE EXTRACTION OF VEGETABLE PROTEIN PRODUCTS

Glenn Davidson, Aurora, Ill.

No Drawing. Application November 6, 1940,
Serial No. 364,550

14 Claims. (Cl. 252—303)

Filtration and centrifuging operate satisfactorily for the separation of certain materials where the solid particles do not tend to a colloidal character, but where materials of highly colloidal character are involved, special problems occur and in many instances filtration or centrifuging is impossible, or extremely difficult. In the case of an alkaline aqueous dispersion of the ground residues from extraction of vegetable oils, for example, vegetable proteinous substances are present which are soluble or dispersible in an alkaline solution, and in addition there are considerable amounts of gummy substances, in some instances designated as galactoaraban, and in some instances as pentosans. These gummy substances are highly colloidal, and are inherently very difficult to separate from protein. Besides, there are smaller components of fiber and ash. To operate at all by filtration or centrifuging, requires an extreme dilution with water, and the character of the material is such that filters very quickly clog. The highly colloidal state of the gummy substances and the small difference in specific gravity causes them to separate imperfectly by centrifuging unless and sometimes even if, the rate of feed to the centrifuge is extremely slow. This means very high power cost per unit of material processed.

In accordance with the present invention, it now becomes possible to efficiently separate such materials which are not readily amenable to direct filtration, or to centrifuging. Liquids containing dissolved materials and gelatinous gummy substances can be divided into a clarified liquid portion and paste-like sludge.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In general, the invention involves transforming the entire mixture to be separated into fine and rather stable foam; and under suitable conditions, allowing the liquid to drain from the foam mass in which the sludge is entrapped, the liquid being drawn off, and the foam proceeding through the stages of consolidation and condensation of volume into a paste or muck-like mass. From this latter, in cases where the liquid carries dissolved material of value to a residual extent entrained in the muck, suitable dilution permits washing such residual matter from the muck mass, and filtration or centrifuging can be then readily applied to such material, and the otherwise waste dissolved matter entrained in the muck may thus be added to that recovered in the initial liquid separation, thereby raising the total recovery of such material to approximately the initial content.

The invention will be readily understood by reference to its practice on an illustrative material, for example a vegetable seed meal from which it is desired to separate the protein from the gums, hemi-cellulose, cellulose fiber, etc. Soya bean flour, as ground from the residue from which the oil has been extracted, and similarly ground cotton seed, peanut, castor bean, tung nut, etc., containing desirable vegetable protein, may in this maner be treated for the separation of the protein from the other material. Thus, the residue of soya bean from which the oil has been suitably extracted, is ground to meal or flour. Depending upon the manner in which the oil has been extracted, the amount of residual oil may vary somewhat, but in general it is small, particularly where the oil has been extracted by a solvent. The process may be successfully applied to material whose fineness of grinding varies over a wide range. Economic factors however, may be taken into account in practice, it being generally desirable to avoid the high power costs connected with very fine grinding, and on the other hand it is desirable that a material be sufficiently fine to allow good extraction of the protein. Flour of the order of ninety per cent minus 300 mesh has been operated in the process, and also flours through a range up into considerable coarseness. A flour passing sixty mesh is satisfactory and convenient. The flour is made up with water and an alkaline dispersing agent, into a foam mass. The proportions of water and flour and alkaline agent may vary. A ten per cent solution or dispersion is satisfactory, i. e. one part of a soya bean flour or the like, and nine parts of water. Higher concentrations of flour, say six parts water to one part flour, will operate, however, there is proportionally more of the dissolved protein entangled in the sludge. As the proportions are made extremely dilute, say twenty parts water to one part flour, the tendency is for the ultimately obtained protein to precipitate in an unsuitable physical state.

In making up the foam, any suitable apparatus may be employed, one convenient form being an agitator mixer in which an air feed is supplied and subdivided by rapidly rotary impeller means. The ratio of the final foam volume to the initial liquid volume (hereinafter called the foam ratio) may vary through a considerable range depending upon a number of factors such as the particle size and the concentration of the material under treatment, the pH and the height of the foam column to be used. In general a 2:1 foam ratio is satisfactory in short columns. With a foam column 36" high a foam ratio of 4:1 is more desirable. In case of a foam column 60" high a foam ratio of 5:1 may be required to produce clean separation. In any event, the various factors effecting the properties and behavior of the foam must be so adjusted that during the process of drainage of the foam, there is little movement of any given bubble with respect to its immediate neighbors, and little or no relative motion of any large mass of the foam with respect to the total body of foam in the container. When such movements occur the separation of sludge from liquid is unsatisfactory.

As alkaline agent, caustic soda or other caustic alkali, or alkaline agents such as alkali metal carbonates, borates, phosphates, etc., may be employed, and the amount may vary. With a rate of less than three and one-half pounds of caustic soda, for instance, to one hundred pounds of soya flour, there is a somewhat higher power requirement in making up a foam to a 4:1 ratio. Dispersions with higher amounts of alkaline agent foam readily. Above five per cent caustic soda there is a tendency for greater foam ratios to be required to get equal efficiency, as the sludge-forming material is more dispersed and there results a less clean-cut separation. To an extent larger foam ratios and larger particle size compensate for higher alkalinities. Four per cent of sodium hydroxide is satisfactory. If the milder alkaline agents be used in amounts less than about five per cent on soya bean flour, it is difficult to produce a 4:1 foam ratio, although lesser foam ratios may be produced, and under suitable conditions be used. For a 4:1 foam ratio, which is particularly advantageous, it is usually desirable to employ ten to fifteen per cent of mild alkaline agents, although much larger amounts, as up to twenty or twenty-five per cent can generally be used without producing the deflocculating effect on the sludge mentioned in connection with the larger amounts of caustic soda. In general, the upper limit of the amount of mild alkaline agents that can be used is set, not by the present process, but by considerations of cost and the question of whether or not large quantities of mild alkaline agent are desirable in the clarified liquid portion. The making up of the foam may be carried out at normal temperature conveniently. Higher temperatures are permissible, and foaming occurs more easily, in most cases. At higher temperatures, however, there is a tendency toward more hydrolysis of the protein. After mixing up the proteinous flour and water and alkaline agent to a smooth homogeneous fine grain foam mass, it is permitted to stand suitably to develop separation. The mass at this stage presents the appearance and consistency of whipped cream. Bubble size is small. In effect, it is a fine reticulum of semi-rigid character. With the lapse of time, liquid percolates out of the reticulum and accumulates below, forming a progressively increasing layer, and by the next day (or sooner in many cases), most of the liquid, carrying the dissolved protein, has separated out from the reticulum so as to be readily drawn off cleanly from below, leaving the gummy substances in the reticulum, which maintains a definite lower boundary which permits a clean separation of liquid which has flowed out. The structure of the reticulum generally has meanwhile undergone progressive change the initial homogeneity going over progressively into vesiculation of progressively increasing coarseness, and after the liquid is finally drawn off from beneath, the superjacent reticulum mass collapses and within a few hours settles down to the bottom, as a sludge-like mass from which some further portion of liquid may be drained through a suitable straining device. The yield of liquid separated will vary with the proportions of materials and the particular conditions employed. Illustratively, seventy per cent to seventy-five per cent (based on the total original liquid volume as 100%) of clarified liquid solution containing the protein may be exuded from the superjacent reticulum before it collapses, and as much as up to about 10 per cent more may be recovered through a straining device. The finally-settled muck, after the liquid has been drawn off, being the residue of the gummy substances with the enmeshed fiber, etc., retains a moistening amount of the liquid solution. The dissolved protein in this may be recovered by adding water and stirring and filtering or centrifuging. A convenient amount of water may be employed. Diluting with three parts of water or to the original volume (before foaming) is satisfactory. The filtrate obtained may be added to the initial liquid separated, or can be treated otherwise as desired. The liquid as initially separated can be run through a filter or centrifuged if desired, but in general it is quite well clarified as coming from the reticulum.

The obtained liquid or solution of protein as extracted and separated from the foamed mass of vegetable protein flour and water, can now be employed for any purpose desired, and for instance is particularly amenable to acid precipitation treatment to recover the protein in solid form and purified condition. For instance, the liquid may be acidulated with a suitable acid, sulphuric or other acid, to precipitate the protein, or any of the procedures of protein precipitation may be applied, as known and need not be further referred to here. Or the first-obtained liquid solution of protein may be employed directly as a sizing solution in various usages, or it may be concentrated further, or it may be spray dried, etc. The residual gummy sludge from the consolidated foam reticulum may be applied to such purpose as may be desired. Where the material which has been foamed involves substances other than crude vegetable proteinous material as illustratively described in the foregoing example, the end result of the process similarly is a clarified liquid exuded and separated from the foam reticulum, and the residual foam sludge may be discarded or be applied to such usages as may be consistent with the nature of the particular material. Where the materials to be separated lack inherent foaming power, a suitable foaming agent, vegetable proteinous flour or other desired foaming agent may be initially added and the materials be made up into a foam mass with water or suitable liquid, and in like manner the foam mass is allowed to stand and separate out a liquid layer below, which can be removed, and be used or not, depending upon whether it contains a valuable component.

Other modes of applying the principle of the invention may be employed, change being made as regards the details described, provided the features stated in any of the following claims, or the equivalent of such, be employed.

I therefore particularly point out and distinctly claim as my invention:

1. A process of clarifying murky solutions capable of being foamed into a stable semi-reticulum containing such gum as is present which comprises converting the entire solution to a foam mass having small bubbles and a relatively stable semi-rigid reticulum, allowing such foam mass to stand under conditions which produce substantially no motion of any large mass of foam with respect to the total body of foam and separate a layer of liquid below, and draining the liquid containing such protein as is present and leaving the foam undisturbed.

2. A process of clarifying murky solutions capable of being foamed into a stable semi-rigid reticulum containing such gum as is present which comprises beating the materials including a foaming agent to a foam mass of small bubbles and a relatively stable semi-rigid reticulum, allowing such foam mass to stand under conditions producing substantially no motion of any large part of the foam mass with respect to the total body of foam and separate a layer of liquid below, and draining the liquid containing such protein as is present and leaving the foam undisturbed.

3. A process of clarifying murky solutions capable of being foamed into a stable semi-rigid reticulum, which comprises converting proteinous and gummy materials to a foam mass with water, said mass having small bubbles and a relatively stable semi-rigid reticulum, allowing the mass to stand under conditions producing substantially no motion of any large portion of foam with respect to the total body of foam and separate a layer of liquid below containing protein, and draining the liquid.

4. A process of clarifying murky solutions capable of being foamed into a stable semi-rigid reticulum, which comprises foaming a vegetable protenious flour with water to a foam mass having small bubbles and a relatively stable semi-rigid reticulum, allowing such foam mass to stand under conditions which produce substantially no motion of any large mass of foam with respect to the total body of foam and separate a layer of liquid below, and draining the liquid.

5. A process of clarifying murky solutions capable of being foamed into a stable semi-rigid reticulum, which comprises foaming a soya bean flour with water to a foam mass having small bubbles and a relatively stable semi-rigid reticulum, allowing such foam mass to stand under conditions which produce substantially no motion of any large mass of foam with respect to the total body of foam and separate a layer of liquid below, and draining the liquid.

6. A process of clarifying murky solutions capable of being foamed into a stable semi-rigid reticulum, which comprises foaming a soya bean flour with water to a foam mass having small bubbles and a relatively stable semi-rigid reticulum, allowing such foam mass to stand under conditions which produce substantially no motion of any large mass of foam with respect to the total body of foam and separate a layer of liquid below, draining the liquid, stirring up the residual foam sludge with water and separating the liquid and adding it to the first-obtained liquid.

7. A process of clarifying murky solutions capable of being foamed into a stable semi-rigid reticulum, which comprises foaming a vegetable protenious flour with water to a foam mass having small bubbles and a relatively stable semi-rigid reticulum, allowing such foam mass to stand under conditions which produce substantially no motion of any large mass of foam with respect to the total body of foam and separate a layer of liquid below, draining the liquid, stirring up the residual foam sludge with water and separating the liquid and adding it to the first-obtained liquid.

8. A process of clarifying murky solutions capable of being foamed into a stable semi-rigid reticulum, which comprises foaming a vegetable proteinous flour with water to a foam mass having small bubbles and a relatively stable semi-rigid reticulum, allowing such foam mass to stand under conditions which produce substantially no motion of any large mass of foam with respect to the total body of foam and separate a layer of liquid below, draining the liquid, stirring up the residual foam sludge with water and separating the liquid.

9. A process of clarifying murky solutions capable of being foamed into a stable semi-rigid reticulum, which comprises foaming a soya bean flour with water to a foam mass having small bubbles and a relatively stable semi-rigid reticulum, allowing such foam mass to stand under conditions which produce substantially no motion of any large mass of foam with respect to the total body of foam and separate a layer of liquid below, draining the liquid, stirring up the residual foam sludge with water and separating the liquid.

10. A process of clarifying murky solutions capable of being foamed into a stable semi-rigid reticulum, which comprises mixing soya bean flour with about nine parts of water to a foam mass having small bubbles and a relatively stable semi-rigid reticulum, allowing such foam mass to stand under conditions which produce substantially no motion of any large mass of foam with respect to the total body of foam and separate a layer of liquid below, draining the liquid, stirring up the residual foam sludge with about three parts of water, and separating the liquid and adding it to the first-obtained liquid.

11. A process of clarifying murky solutions capable of being foamed into a stable semi-rigid reticulum, which comprises mixing soya bean flour with about nine parts of alkaline solution to a foam mass having small bubbles and a relatively stable semi-rigid reticulum, allowing the mass to stand under conditions which produce substantially no motion of any large mass of foam with respect to the total body of foam and separate a layer of liquid below, draining the liquid, stirring up the residual foam sludge with about three parts of water, and separating the liquid.

12. A process of clarifying murky solutions capable of being foamed into a stable semi-rigid reticulum, which comprises mixing soya bean flour with about nine parts of alkaline solution to a foam mass having small bubbles and a relatively stable semi-rigid reticulum, allowing the mass to stand under conditions which produce substantially no motion of any large mass of foam with respect to the total body of foam and separate a layer of liquid below, and draining the liquid.

13. A process of clarifying murky solutions capable of being foamed into a stable semi-rigid reticulum, which comprises mixing a vegetable proteinous flour with sodium hydroxide solution of about four per cent concentration and forming a foam mass having small bubbles and a relatively stable semi-rigid reticulum, allowing the mass to stand under conditions which produce substantially no motion of any large mass of foam with respect to the total body of foam and separate a layer of liquid below, and draining the liquid.

14. A process of clarifying murky solutions capable of being foamed into a stable semi-rigid reticulum, which comprises mixing a vegetable proteinous flour with an alkaline solution and forming a 4:1 ratio of foam having small bubbles and a relatively stable semi-rigid reticulum, and allowing the mass to stand under conditions which produce substantially no motion of any large mass of foam with respect to the total body of foam and separate a layer of liquid below.

GLENN DAVIDSON.